June 28, 1927.
N. A. CHRISTENSEN
1,633,766
ENGINE DRIVEN COMPRESSOR
Filed Nov. 23, 1925    2 Sheets-Sheet 2
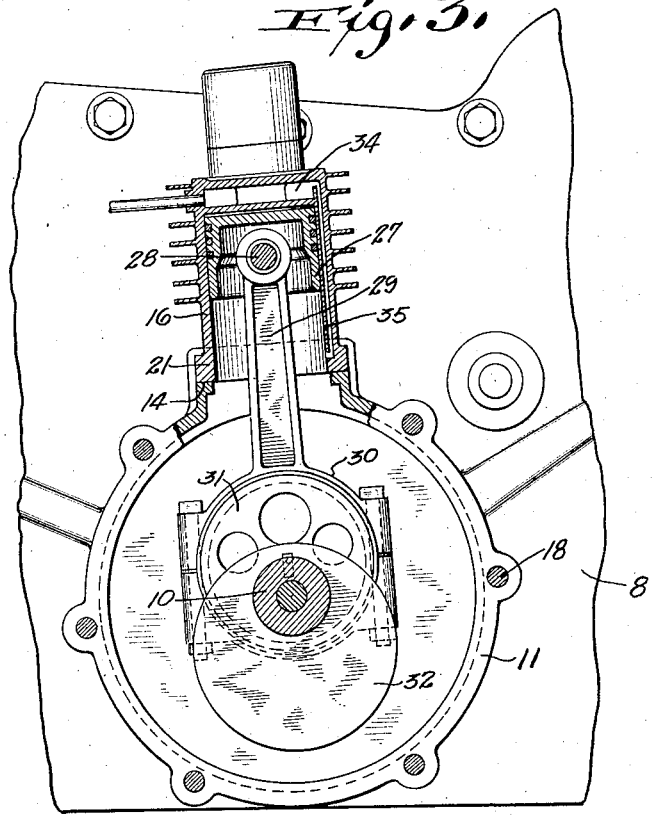
INVENTOR.
Niels A. Christensen
BY
Charles F. French
ATTORNEY.

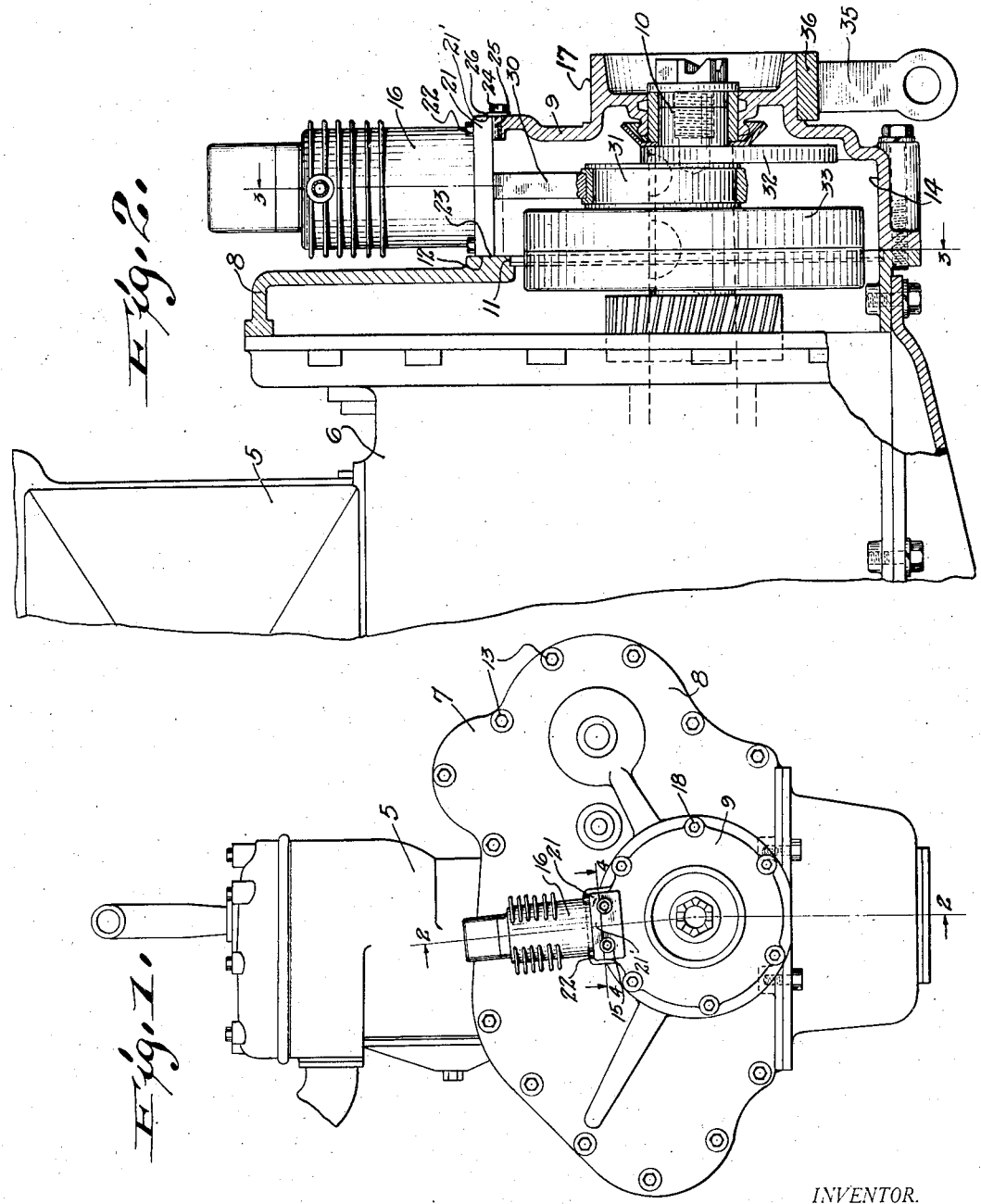

Patented June 28, 1927.

1,633,766

UNITED STATES PATENT OFFICE.

NIELS A. CHRISTENSEN, OF MILWAUKEE, WISCONSIN.

ENGINE-DRIVEN COMPRESSOR.

Application filed November 23, 1925. Serial No. 70,908.

The invention relates to compressors, and more particularly to compressors associated with an internal combustion engine for furnishing compressed air for starting the engine, or for the brake equipment where the engine is used on automotive vehicles.

The object of the invention is to provide a compressor mounting in which the front end cover plate of the engine is formed of separable sections, one of which provides a crank case for the compressor and a support for the compressor cylinder, with provision for inspecting and adjusting the bearings of the compressor upon removal of the compressor cylinder and one of the cover plate sections.

The invention further consists in the several features hereinafter set forth and more particularly defined by claims at the conclusion hereof.

In the drawings, Fig. 1 is a front elevational view of an automotive type engine equipped with apparatus embodying the invention;

Fig. 2 is a detail sectional view taken on the line 2—2 of Fig. 1;

Fig. 3 is an elevational view of one section of the front cover plate, with parts broken away, and a sectional view taken along the line 3—3 of Fig. 2 through the upper part of the other section of the cover plate and the compressor cylinder;

Fig. 4 is a detail sectional view taken on the line 4—4 of Fig. 1.

In the drawings the numeral 5 designates an internal combustion engine of the high speed or automotive type in which the timing gears for the cam shaft drive and the other gears for the generator drive and the fan are mounted at the front end of the crankcase 6 of the engine, within a housing formed by the engine crankcase and a front cover plate. According to the present invention, the front cover plate 7 is formed of two sections 8 and 9 through which the front end 10 of the crank shaft of the engine extends. It will, of course, be understood that the main bearings for the crank shaft are within the engine crank case proper adjacent the throws of the crank shaft.

The section 8 of the front cover plate, which encloses the timing gears, has an opening 11 therein with a flat surface 12 and is secured to the main crank case of the engine by bolts 13.

The section 9 of the front cover plate is designed to form a crank case 14 for the compressor and has a mounting pad or portion 15 thereon to support the cylinder 16 of the compressor, and has a trunnion bearing portion 17 through which the front end of the crank shaft extends. This section 9 is detachably secured at its rear side against the face 12 of the section 8 by bolts 18.

The pad portion 15 has a bore 19 formed therein, communicating with the crank case 14 and a slot 20. The cylinder 16 of the compressor has a flanged base 21 provided with holes to take the bolts 22 that extend into tapped holes 22' in the pad portion 15, and the rear edge 23 of said base 21 abuts against the face 12 and forms a tight joint therewith. The holes in the base 21 for the bolts 22 are large enough so as to permit a slight lateral movement of the base 21 relative to the pad 15, during assembly, so that just before the bolts 22 are finally tightened up the base 21 may be moved laterally to bring its edge 23 against the face 12 and maintain it in this position by means of bolts 24 having threaded engagement with tapped holes 25 in the section 9 and provided with washers 26 engageable with the front face 15' of said base 21 and exerting pressure thereon. Thus, the cylinder 16 is removably secured to the pad 15 over the bore 19 and slot 20 and abuts against the section 8 of the cover plate so as to form a tight joint therewith.

A piston 27 works in the cylinder of the compressor and is operatively connected to the end 10 of the crank shaft of the engine by means of a wristpin 28 and a connecting-rod 29, with its adjustable big end-bearing 30 formed as an eccentric strap to fit over the eccentric 31, provided with a counterbalance weight 32, and which is keyed to the end 10 of the crank shaft adjacent the balancer 33 on said shaft.

The inlet and exhaust valves of the compressor are not shown in detail but may be of any suitable construction.

With this construction the piston 27 of the compressor is driven by the engine crank shaft to compress air in the compressor cylinder and expel it to the reservoir. As the cylinder is removable independent of the cover plate, the piston rings and the wristpin may be readily inspected or removed, when desired, by taking off said cylinder. In case any adjustment or renewal of the big end-bearing of the connecting-rod 29 is necessary, the removal of the cylinder 16 permits the taking off of the section 9 of the front cover plate by release of the bolts 18 and thus permits ready access to said big end-bearing, the slot 20 preventing any interference between the connecting-rod and said plate during its removal.

Inasmuch as the crank case 14 of the compressor is an extension of the main crank case of the engine, the lubricating system for the compressor may use the same lubricating oil as the engine, and the oil dripping or coming down from the walls of the compressor cylinder below the piston will serve to oil the big end of the connecting-rod and find its way into the crankcase of the motor and return to the main oil sump of the engine. As shown, the cylinder of the compressor head of the compressor has a cooling space 34 into which the lubricating oil of the main engine is forced and from which the oil flows through a passage 35 into the lower end of the cylinder and then to the crank case 14.

With this construction it is an easy matter to remove the relatively small cover plate section 9, while the front end of the engine is raised from the trunnion bearing support 36, so as to gain access to the big end-bearing of the compressor drive.

I desire it to be understood that this invention is not to be limited to any specific form or arrangement of parts except in so far as such limitations are specified in the claims.

What I claim as my invention is:

1. In an internal combustion engine, the combination with the engine crank case and an engine shaft, of a sectional front cover plate secured to the crank case of the engine and providing a compressor crank case and a compressor cylinder-supporting portion, a compressor cylinder mounted upon said cylinder-supporting portion, a piston working in said cylinder, and a driving connection between said piston and said shaft including a connecting-rod having an adjustable big end bearing, said sections being detachably connected together and so constructed and arranged as to permit adjustment of said bearing in assembled relation with said shaft upon the disconnection of one of said sections from the other.

2. In an internal combustion engine, the combination of a front cover plate having a cover section secured to the crank case of the engine, and a cover section detachably secured to said first-named section and having a compressor crank case portion into which the front end of the crank shaft of the engine extends, said second-named cover section having a cylinder-supporting portion, a compressor cylinder mounted upon said cylinder-supporting portion, a piston working in said cylinder, and a driving connection between said piston and that portion of the engine crank shaft extending into said compressor crank case including a connecting-rod, said second-named cover section having a slot in its cylinder-supporting portion permitting of the removal of said section without disconnecting said connecting rod.

3. In an internal combustion engine, the combination with the crank case of the engine, of a front cover plate comprising a cover section secured to the crank case of the engine and a cover section removably secured to the front face of said first-named cover section, said second-named section providing a compressor crank case and a slotted compressor-cylinder-supporting portion, and a compressor cylinder having its base portion mounted on said cylinder-supporting portion of said second-named cover section and covering said slot and having its rear edge abutting against the front face of said first-named cover section.

4. In an internal combustion engine, the combination with the crank case of the engine, of a front cover plate comprising a cover section secured to the crank case of the engine and a cover section removably secured to the front face of said first-named cover section, said second-named section providing a compressor crank case and a slotted compressor-cylinder-supporting portion, a compressor cylinder having its base portion mounted on said cylinder-supporting portion of said second-named cover section and covering said slot and having its rear edge abutting against the front face of said first-named cover section, means for forcing said rear edge into tight engagement with said front face and for maintaining it in this position, a piston working in said cylinder, and a driving connection between said piston and a power shaft of said engine including a connecting-rod, said slot permitting of the removal of said second-named cover section without disconnecting said connecting-rod.

5. In an internal combustion engine, the combination with the engine crank case and the engine crank shaft, of a sectional front cover plate secured to the crank case of the engine and providing a compressor crank case and a cylinder-supporting portion, one of said sections having a trunnion bearing portion, said sections being joined together in a plane permitting access to said crank case upon the disconnection of that section having said trunnion bearing portion.

In testimony whereof, I affix my signature.

NIELS A. CHRISTENSEN.